US005536429A

United States Patent [19]
Bennett et al.

[11] Patent Number: 5,536,429
[45] Date of Patent: *Jul. 16, 1996

[54] METHOD FOR TREATING COKE AND COAL AND PRODUCTS PRODUCED THEREBY

[75] Inventors: Robert P. Bennett, Houston, Tex.; Steve Muth, Des Plains, Ill.

[73] Assignee: Benetech, Inc., Aurora, Ill.

[*] Notice: The term of this patent shall not extend beyond the expiration date of Pat. No. 5,310,494.

[21] Appl. No.: 321,989

[22] Filed: Oct. 12, 1994

Related U.S. Application Data

[63] Continuation-in-part of Ser. No. 209,162, Mar. 10, 1994, which is a continuation-in-part of Ser. No. 875,341, Apr. 29, 1992, Pat. No. 5,310,494.

[51] Int. Cl.$^6$ .................................................. C09K 3/22
[52] U.S. Cl. .................................. 44/620; 252/88.1
[58] Field of Search ............................ 252/88; 44/620, 44/607, 391, 545, 578; 422/136

[56] References Cited

U.S. PATENT DOCUMENTS

| | | | |
|---|---|---|---|
| 1,916,539 | 7/1933 | Spencer | 44/620 |
| 2,204,781 | 6/1940 | Wattles | 44/620 |
| 2,346,650 | 4/1944 | Bornstein | 44/620 |
| 2,383,543 | 8/1945 | Gray | 44/620 |
| 3,337,312 | 8/1967 | Perlus | 44/607 |
| 3,766,077 | 10/1973 | Hwa et al. | 252/180 |
| 4,214,875 | 7/1980 | Kromrey | 44/620 |
| 4,264,333 | 4/1981 | Shaw et al. | 44/620 |
| 4,326,962 | 4/1982 | Jones et al. | 210/698 |
| 4,417,992 | 11/1983 | Bhattachryya | 252/88 |
| 4,468,232 | 8/1984 | Funk | 44/621 |
| 4,594,268 | 6/1986 | Kirwin | 427/136 |
| 4,650,598 | 3/1987 | Roberts et al. | 252/88 |
| 4,810,405 | 3/1989 | Waller et al. | 252/101 |
| 4,824,589 | 4/1989 | Magyar et al. | 252/82 |
| 5,024,783 | 6/1991 | Busch et al. | 252/181 |
| 5,028,238 | 7/1991 | von Rybinski et al. | 44/280 |
| 5,194,174 | 3/1993 | Roe et al. | 252/88 |
| 5,310,494 | 5/1994 | Bennett | 252/88 |

FOREIGN PATENT DOCUMENTS

| | | |
|---|---|---|
| 49-31589 | 3/1974 | Japan. |
| 59-174695 | 10/1984 | Japan. |

*Primary Examiner*—Stephen Kalafut
*Assistant Examiner*—James M. Silbermann
*Attorney, Agent, or Firm*—Rosenblatt & Redano

[57] ABSTRACT

A method and composition for control of in-transit and residual dust, erosion, and wetting of coal or coke feeds is provided. The method involves spraying the coal or coke with a solution comprising a fluid, preferably water, containing a sufficient amount of an additive comprising (a) approximately 90–99 wt % of a binder, preferably a lignosulfonate, a polyether, a polyol, or a byproduct produced during the refining of a natural sugar, and (b) 1–10 wt % of a polyacrylate, a polyvinylalcohol, or a polyacrylamide. The additive also preferably contains a surfactant. The amount of solution/additive that is necessary will vary according to the desired result and the conditions to which the coke or coal will be subjected.

34 Claims, No Drawings

METHOD FOR TREATING COKE AND COAL AND PRODUCTS PRODUCED THEREBY

RELATED APPLICATIONS

The present application is a continuation-in-part of copending application Ser. No. 08/209,162 filed Mar. 10, 1994, which was a continuation-in-part of Ser. No. 07/875,341 filed Apr. 29, 1992, now issued as U.S. Pat. No. 5,310,494.

BACKGROUND

Dust produced during the handling, transport, storage, crushing, and utilization of coal and petroleum coke is not only a nuisance, it is a major health and safety issue facing the petroleum and coal industry. Fires, explosions, and black lung cost the petroleum, mining, utility and steel industries millions of dollars annually due to lost production, medical expenses, lost equipment, and high insurance premiums. The control of coal and coke dust is imperative, as can be seen from increased internal control efforts at plants that handle these materials and from increased government enforcement of air quality particulate standards.

Dust from coal or coke is produced and airborne by two major mechanisms—impact or wind erosion. A ton of coke or coal may travel at 20 miles per hour on a refinery conveyor belt only to be dumped onto a transfer chute. The impact can produce a substantial amount of airborne particulate matter. Fine particulates also are produced during stacking, crushing, milling, breaking, or reclaiming operations. Whenever coal or coke is in motion and subjected to impact, dust is generated.

One method that has been used in the past to control such dust is by spraying the coal or coke with water. Water is effective to prevent dusting; however, the water evaporates rather quickly. Therefore, the coal or coke must be sprayed almost continuously in order for water to be an effective anti-dusting agent. This continuous spraying is cumbersome and costly, and the droplets of water in the spray often do not even capture the finest, most hazardous particulates. Furthermore, not all coals can be wetted using water, and, in some uses, moisture level restrictions will be exceeded if too much water is used. Also, an economic penalty may result because it is less efficient to burn high moisture coke or coal. In addition, water has little, if any residual effect. Once applied, water generally does not continue to reduce dusting at downstream operations and evaporates quickly from pile or storage surfaces. Surfactants can be added to the water to improve coal wettability in some instances; however, the problem of evaporation remains. Because petroleum coke is even more difficult to wet than coal, water is an even less effective anti-dusting agent when used with coke.

Organic chemicals, such as lauryl sulfate, alkanol amide, and oil, which may be blended with wax, asphalt, or other bitumens, also have been used to prevent dusting. These organic chemicals are effective to avoid the need to continuously spray the coal or coke because they control fugitive dust at very low concentrations. However, like water, organic chemicals tend to have little residual effect. Therefore, organic chemicals generally do not continue to reduce dusting at downstream operations. Furthermore, environmental regulations governing the sale and use of waste oils have tended to decrease the use of oil as an anti-dusting agent.

Another dust control method is the use of foam comprised of air, water, and a foaming agent. The addition of a foaming agent to the water generates a large volume of foam from a small amount of water. Therefore, the addition of a foaming agent allows for dust control using much less water. For example 0.5 gallons of water may be expanded to form 15 to 20 gallons of foam. And much less foam is required to achieve the same anti-dusting effect as water. Like water, a high pressure stream of foam "knocks-down" a fair amount of the larger particulates in the coal dust. When the foam bubbles impact the dust particles, the particles are wet by the imploding bubbles and captured. Many fine droplets also are released to scrub more fine particles. Although foam is effective to control fugitive dust, and even has a short term residual effect, once the water in the foam has evaporated, the residual effect essentially disappears.

Encrusting agents or chemical binders, such as latex or lignosulfonates which result from the processing of wood for paper products, also have been used to coat piles of coal to reduce wind-eroded fugitive emissions. However, encrusting agents and chemical binders usually are used as surface coatings only, which do not reduce the emissions that may result during later handling of the stored coal.

A significant amount of effort has been devoted to finding an additive which would treat all of the coal or coke during active storage to prevent dusting on very active piles. Highly dilute latexes, oil, emulsions, flocculants, molasses, and lignosulfonates have been used for this purpose; however, weathering, biodegradation, and adsorption into the coal have frustrated many of these attempts. Thus, it is apparent that a product is needed which would reduce in-transit losses and dusting, and which would continue to suppress dusting throughout the off-loading and handling operations at the plant.

SUMMARY OF THE INVENTION

The present invention is a method and composition for treating coal or coke to: (a) control in-transit and residual dust; (b) repel fluids; and (c) control erosion of the coal or coke during storage. The invention involves spraying the coal or coke with a fluid, preferably water, containing an additive comprised of: (a) a surfactant; (b) about 90–99 wt % water soluble binder/tackifier, preferably either lignosulfonate, a polyether, a polyol, a byproduct produced during the refining of a natural sugar, or a combination thereof; and (c) about 1–10 wt % of a polymer dispersant, preferably either a polyacrylic acid, a polyacrylamide, or a polyvinyl alcohol. The molecular weight of the polymer should be low enough (a) to prevent the polymer from becoming too viscous to pump before dilution with water, and (b) to permit the polymer to be miscible in water. To be water-miscible, a non-substituted polyacrylate or polyvinylalcohol generally should have a molecular weight of about 20,000 or below, and a polyacrylimide should have a molecular weight of about 200,000 or below. If a polymer has substituents that increase its water-miscibility, then the molecular weight of the substituted polymer may be increased so long as the resulting polymer is still water miscible. It is preferable to use as little fluid or water as possible; however, sufficient fluid must be used to coat the coal or coke. The amount of additive that is required will vary according to the purpose for using the additive and the conditions to which the sprayed coke or coal will be subjected.

DETAILED DESCRIPTION OF THE INVENTION

When the additive-containing solutions of the present invention are used to treat coke and coal, a number of different advantages are achieved. These advantages include controlling in-transit dust production, preventing erosion of coke and coal piles, and helping coke and coal piles to repel fluid. The primary agent for the control of dust production is a water soluble binder which agglomerates the fines, preventing the fines from becoming airborne. The trapped fines thereby cannot contribute to fugitive dust and wind erosion. Residual activity controls dusting even when the coal or coke is handled long after the original application of the additive solution.

The primary agent responsible for repelling water and preventing erosion is believed to be the water-borne polymeric dispersant. After coke or coal has been treated with the water-borne polymeric dispersant, the addition of water or other fluid causes the fines present in the coal or coke to form a barrier or a crust. The water apparently dissolves the binder/tackifier and the dispersant suspends the fines, allowing the fines to be carried down into the coal or coke pile. How far the slurry travels depends upon the amount of fines that are present. After the slurry has traveled several inches into the pile, the water effectively becomes saturated with suspended fines. These suspended fines then plug the interstices of the larger particles, forming a crust or barrier which repels water or fluid, causing the fluid to simply run off of the pile without eroding the pile.

One ingredient contained in the additive of the present invention is a surfactant. The surfactant acts as a spreading agent which aids in applying the solution and minimizes the amount of water required to coat the material being treated.

Another ingredient contained in the additive is a water-soluble binder/tackifier. A preferred binder/tackifier is lignosulfonate. Lignosulfonates are available from a wide variety of commercial sources in either neutralized or unneutralized form. It is believed that any of these commercially available lignosulfonates will function in the present invention. A preferred lignosulfonate for use in the present invention is LIGNOSITE 686, a calcium neutralized lignosulfonate, CAS Registry No. 68131-32-8, available from Georgia Pacific Corporation, 300 West Laural Street, Bellingham, Wash. 98225, Post Office Box 1236 (98227).

Other binder/tackifiers that are suitable for use in the present invention include byproducts produced during the refining of natural sugars, polyethers, and polyols. Examples of suitable byproduct sugar syrups include BREWEX™ (a malto-dextrine byproduct), MOTEK™ (a sugar beet molasses byproduct), and any number of byproducts derived from refining natural sugars. Examples of a suitable polyols include sorbitol, mannitol, arabitol, polyglycerin, glycerin, and similar polyols. Suitable polyethers include diethylene glycol and other polyethylene glycols. The primary limitation on the binder/tackifier is that it should be water soluble.

The polymer dispersant used in the additive of the present invention preferably has the following general structure:

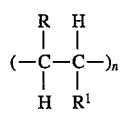

wherein R preferably is a hydrogen or an alkyl group having between about 1–4 carbon atoms, and $R^1$ is —COOH, $CONH_2$, or OH, or other similar substituents capable of rendering the polymers water soluble.

The value of n will vary depending upon the particular polymer and its substituents. As already explained, n generally can be higher when R is a smaller substituent. For example, when the polymer is polyacrylate and R is hydrogen, n should be between about 14–280; however, when R is a butyl group, n should be between about 8–155. When the polymer is polyvinylalcohol and R is hydrogen, n should be between about 23–614; however, when R is a butyl group, n should be between about 10–267. Finally, when the polymer is polyacrylamide and R is hydrogen, n should be between about 14–2817; however, when R is a butyl group, n should be between about 8–1562. Anionic, nonionic, and cationic polyacrylamides all should be useful in the present invention.

The polymer should have a viscosity that can be pumped before dilution with water. The molecular weight is limited only in that the polymer should be miscible in water. To be miscible, a non-substituted polyacrylate or polyvinylalcohol generally should have a molecular weight of about 20,000 or below, and a non-substituted polyacrylimide should have a molecular weight of about 200,000 or below. If the polymer has substituents that increase its miscibility in water, then the molecular weight may be increased so long as the resulting polymer is still water miscible.

Polyacrylates, polyvinyl alcohols, and polyacrylamides suitable for use in the present invention are widely commercially available in either neutralized or unneutralized form. A preferred polyacrylate for use in the present invention is ALCOSPERSE 149, available from Alco Chemical Corporation, 909 Mueller Drive, Chattanooga, Tenn. 37406. Suitable polyacrylamides include, e.g., the CYANAMER® line of polyacrylamides available from American Cyanamid Co., Cytec Industries, Garret Mountain Plaza, West Patterson, N.J. 07424. A preferred polyacrylamide is Cyanamer A370 (CAS 9003-05-8). Suitable polyvinylalcohols include, e.g., the AIRVOL® line available from Air Products and Chemicals, Inc., 7201 Hamilton Blvd., Allentown, Pa. 18195. A preferred polyvinylalcohol is Airvol 203 (CAS 9002-89-5).

Any of the commercially available polyacrylates, also known as polycarbonates, their derivatives, e.g., polymethacrylates, and any of the commercially available polyacrylamides, polyvinylalcohols, or their derivatives, should function in the present invention as long as they are soluble in the lignosulfonate, have similar dispersant activity, and do not adversely affect the viscosity of the resulting mixture. For example, non-substituted polyacrylates or polyvinyl alcohols having a molecular weight above about 20,000, and non-substituted polyacrylamides having a molecular weight above about 200,000 could present handling problems. A larger polyacrylate or polyvinyl alcohol with no substituents that render it more miscible could be more difficult to pump into the system, e.g., during cold weather. Therefore, as a practical matter non-substituted polyacrylates and polyvinyl alcohols having a molecular weight below approximately 20,000, and non-substituted polyacrylamides having a molecular weight below about 200,000, are preferred. However, derivatives of these polymers which have higher molecular weights but also contain substituents rendering the polymer more water-miscible also should function in the present invention.

In a preferred method of forming the additive of the present invention, the polymer is added to the lignosulfonate to form a final solution which contains approximately 1–10 wt % of polymer. Because these polymers tend to be relatively expensive, a lower percentage of approximately 1 wt % typically will be preferred for economic reasons. Also, the final solution will be less viscous if it contains a lower percentage of polymer.

In a preferred method for making the additive of the present invention, ALCOSPERSE 149 is added to LIGNOSITE 686 during manufacture of the LIGNOSITE 686, preferably after neutralization of the lignosulfate, a process which generates heat. Thus, in a preferred method, a polyacrylate is added to warm lignosulfate; however, it is not necessary to warm the lignosulfate before adding the polyacrylate. In fact, polyacrylate will dissolve in lignosulfate even at ambient temperatures. A sufficient amount of ALCOSPERSE 149 is added to the LIGNOSITE 686 to form a mixture containing 1 wt % of ALCOSPERSE 149.

For application to the coke or coal, the additive should be added to a fluid, preferably water, at a ratio which allows for a sufficient amount of solution to coat the coke or coal. Water is a preferred fluid because the additive is readily soluble in water, water evaporates from the coke or coal, and water is readily available and cost efficient. However, other fluids capable of solubilizing the additive also may function in the present invention.

The ratio of fluid to additive is not critical to the present invention. The ratio of fluid to additive could range between approximately 1:1 to 20:1, depending upon the conditions of application. A preferable ratio of water to additive for typical coke handling operations is 10:1. The additive may be added to a given volume of water all at once or, preferably, procedures well known in the art may be used to proportion the additive for supply to a continuous flow system.

The resulting solution then may be sprayed onto coal or petroleum coke using a suitable nozzle, for example, the nozzle designated H 1/2 U—65100, available from J. F. England, 901 N. Valley Mills Drive, Waco, Tex. 76701. Typically, a V-jet nozzle arrangement is an efficient arrangement for applying anti-dusting agents to coke and coal. The spray should be positioned at the earliest transition point at which adequate coverage of the coal or coke may be obtained. Locating the spray as far upstream as possible should achieve the benefits of lower dust levels, lower cost related to maintenance of both belting and rollers, and a reduction in clean up frequency.

A sufficient amount of solution should be applied to prevent dusting of the coke or coal. The amount necessary to prevent dusting may vary between approximately 0.05–0.5 gallons of additive per ton of coal, depending upon the conditions to which the sprayed coke or coal will be subjected. For example, the necessary amount will be higher the longer the coke or coal is to be stored and/or the higher the fine particulate content of the coke or coal. For purposes of thirty day storage of a typical petroleum coke, a rate of at least 0.065–0.070 gallons/ton is sufficient, preferably 0.07 gallons per ton. Although the procedure is less expensive if less solution is used, an even greater cost would be incurred if a plant were forced to temporarily cease operations due to excursions over the necessary dust level. Thus, although 0.065 gallons/ton (or possibly even less in some applications) may function to suppress in-transit and residual dusting prior to thirty day storage, 0.07 gallons per ton adds a small margin of "insurance" to prevent any such excursions.

Application of the foregoing solution before stacking, alone, should be sufficient to prevent dusting both during storage and during subsequent loading of coal and coke. However, if desired, the solution may be sprayed on the coal or coke both during stacking and during loading. Also, if it is possible that the additive has somehow been inactivated during storage, e.g., by an excessively long period of storage, the additive can be reactivated simply by spraying a small amount of water on the coal or coke.

The present invention will be further elucidated by the following examples:

EXAMPLE 1

The following study was conducted to develop and implement improvements to fugitive dust control technology used to control dust from petroleum coke stored openly and exposed to weathering and winds. The purpose of the study was to (1) formulate a product to control petroleum coke dusting; (2) determine the most effective location for the application; (3) optimize the spray patterns to obtain the most complete coverage of the coke; and, (4) determine the optimum feed rate needed to maintain high performance at the lowest cost possible. Information was collected for approximately four months.

A water solution containing additive comprised of approximately 1 wt % of ALCOSPERSE 149 in LIGNOSITE was prepared, as described above. The solution was sprayed on the coke at varying feed rates from a nozzle placed approximately ten feet above the belt at a transition point located just before stack out. A distance of ten feet between the nozzle and the belt was chosen to avoid plugging of the nozzle. A second nozzle applied chemical at the same concentration to the back side of the falling coke for complete coverage.

During the first three weeks, the entire yard was stacked out with coke treated according to the present invention using 0.1 gallons/ton of additive. During the next five weeks, the feed rate was lowered in successive steps to determine the lowest feed rate capable of maintaining dust suppression. The lowest feed rate tested was 0.065 gallons/ton of coke.

Dust monitoring was done in the coke stack out and ship loading areas. Three methods were used in the various locations to check the fugitive dust levels from coke handling. these three methods were:

-Visual Inspection:

Routine visual checks are the most reliable method for monitoring outdoor fugitive dusting. Inspections were made from locations near the storage area. No visual dust was detected.

-RAM-1

A RAM (Real Time Aerosol Monitor) was used as both a portable and stationary test device using procedures well known and accepted by those of skill in the art. The RAM detects both respirable and nuisance dust and correlates this into mg of particulate per $m^3$. During normal stack out, the RAM was placed at the ground level at the point of application of the solution next to the belt to monitor dust levels and to give a relative comparison of treated and non-treated coke. During ship loading, the RAM was moved to the head pulley, or the last roller before unloading of the coke into the ship, to monitor the dust levels. For each separate feed level, the RAM was used as a portable dust monitor and carried out to the piles for monitoring over an extended period of time. At no time at any test location where the present solution had been in use was dust detected.

-Handy Vol—High Volume Filter Collector

The Handy Vol dust measuring instrument pulls large quantities of the air to be tested through a fabric filter. The filter is weighed before and after the sampling to determine the quantity of dust or particulate matter in a given location.

The Handy Vol was used at several locations around the storage areas. All readings showed substantially no dust on the filter.

The results indicate that treatment with the solution was effective to suppress dusting at every level of additive applied. Each feed rate was maintained for approximately one week. No visual dust from the stacker was observed, and the RAM readings indicated essentially —0— $mg/m^3$ of particulates at all feed rates. Feed rates were established for optimum performance. Coke pile integrity was improved and maintained throughout the stack out period.

EXAMPLE 2

A separate test pile was stacked out to a height of 45'. The first 35' were coated with 0.065 gallons additive per ton, and the last 10' were coated with 0.15 gallons additive per ton. The purpose of this test was to show the benefit of the residual effect from the use of the present solution and the ability of the present solution to maintain the integrity of the coke pile. If pile stability can be maintained at this level, more coke can be stacked in the yard. For example, assuming a stack is 75' wide and 200' long, the extra 10' of height between 35' and 45' would hold approximately 115,500 cubic feet of coke, or 2,457 tons. This amounts to approximately a thirty percent increase in pile capacity.

During the test, the aerial water sprays were isolated in the control system so that the pile could be observed for erosion by the wind. The increased feed rate of the solution caused a crusting effect on the surface. Under these conditions, no coke fines or dusting was observed. Although rain was encountered periodically during the test, it was determined that the use of aerial sprays could be greatly reduced if not eliminated.

During the test period, heavy rains were encountered. On one occasion, five inches of rain fell and actually flooded the surrounding streets but had no effect on the test pile. No erosion by water was observed. Prior to the present test procedure, continuous preventive maintenance was required to keep the reclaimer tracks clear because of pile slippage. This involved a man and a "bobcat" removing the slipped coke from the reclaimer tracks. During the one hundred and twenty days of the test, the use of the "bobcat" for cleanup was not required.

During the test period, an aerial spray that normally was used to apply water to the opposite side of the coke yard became struck and sprayed the northeast side of the pile for several minutes. Water erosion was observed, and moisture tests were taken to determine the water content of the slipped coke. Readings of 14.2% were obtained, as compared to 5.6% on the surface 30 feet south of the slippage. However, the stability of the remainder of the pile and the portion of the pile located directly above the point of impact of the spray was maintained.

EXAMPLE 3

Example 2 was repeated, except the entire 45' stack was coated with 0.065 gallons additive per ton of feed. Similar results were obtained with the resulting stack, indicating that 0.065 gallons additive per ton was sufficient even to treat a 45' stack.

EXAMPLE 4

An additive was made of LIGNOSITE 686 (99.0 gms) and AIRVOL® 203, which was obtained from Air Products and Chemicals Inc.. The resulting additive was diluted with water (1 part additive to 19 parts water) to form a solution.

Petroleum coke was spread out in a pan, and the foregoing solution was sprayed on the coke at a rate of final solution of 1.30 gal. per ton (0.065 gal additive per ton of coke). The coke was dried and evaluated for dustiness compared to untreated coke and coke treated with the polyacrylate-containing formula.

The results were evaluated based on the appearance, dropping coke from several feet into another container and observing dustiness, directing a fan over the surface of the treated coke and observing any material blown free. No visual dust was observed.

EXAMPLE 5

An additive made of 70 parts BREWEX™, 27 parts urea, 2 parts sodium dioctyl sulfosucinate, and 1 part ALCOSPERSE 149, was diluted with water at a ratio of about 1 part product to about 30 parts water. The resulting solution was sprayed on coal as it was transferred from rail cars to barges at several belt transfer points along the conveyor system between the trains and barges. Treatment rates of as little as 0.04 gallons of solution per ton of coal were shown to dramatically reduce the dust emissions at the barge unloading facility several days later. Dust levels were monitored visually as the coal was unloaded from the barges by crane.

One of skill in the art will appreciate that many modifications may be made to the embodiments described herein without departing from the spirit of the present invention. Accordingly, the embodiments described herein are illustrative only and are not intended to limit the scope of the present invention.

We claim:

1. A method for treating coal and coke feeds to prevent dusting and erosion of said feeds comprising applying to said feed a solution containing an additive in an amount sufficient to treat said feed, said additive comprising:
   - a dispersant comprising a water-miscible polymer selected from the group consisting of a polyacrylate, and a polyacrylamide; and
   - an amount of a water soluble binder that exceeds the amount of said dispersant.

2. The method of claim 1 wherein said additive comprises approximately 90–99 wt % of said binder and approximately 1–10 wt % of said dispersant.

3. The method of claim 1 wherein said additive further comprises a surfactant.

4. The method of claim 1 wherein said dispersant is selected from the group consisting of a polyacrylate which, without substituents, has a molecular weight of about 20,000 or below, and a polyacrylamide which, absent substituents, has a molecular weight of about 200,000 or below.

5. The method of claim 2 wherein said dispersant is selected from the group consisting of a polyacrylate which, absent substituents, has a molecular weight of about 20,000 or below, and a polyacrylamide which, absent substituents, has a molecular weight of about 200,000 or below.

6. The method of claim 1 wherein said binder is selected from the group consisting of a lignosulfonate, a polyether, a polyol, one or more water soluble byproducts produced during the refining of a natural sugar, and combinations thereof.

7. The method of claim 2 wherein said binder is selected from the group consisting of a lignosulfonate, a polyether, a polyol, one or more water soluble byproducts produced during the refining of a natural sugar, and combinations thereof.

8. The method of claim 5 wherein said binder is selected from the group consisting of a lignosulfonate, a polyether, a polyol, one or more water soluble byproducts produced during the refining of a natural sugar, and combinations thereof.

9. The method of claim 8 wherein said solution further comprises water at a volume ratio to said additive within a range of approximately 1:1 to 20:1.

10. The method of claim 1 wherein said solution is applied to said feed at a rate sufficient to apply approximately 0.05 to 0.5 gallons of additive per ton of feed.

11. The method of claim 1 wherein said solution is applied to said feed at a rate sufficient to apply approximately 0.065 to 0.07 gallons of additive per ton of feed.

12. The method of claim 2 wherein said solution is applied to said feed at a rate sufficient to apply approximately 0.05 to 0.5 gallons of additive per ton of feed.

13. The method of claim 2 wherein said solution is applied to said feed at a rate sufficient to apply approximately 0.065 to 0.07 gallons of additive per ton of feed.

14. The method of claim 5 wherein said solution is applied to said feed at a rate sufficient to apply approximately 0.05 to 0.5 gallons of additive per ton of feed.

15. The method of claim 5 wherein said solution is applied to said feed at a rate sufficient to apply approximately 0.065 to 0.07 gallons of additive per ton of feed.

16. The method of claim 8 wherein said solution is applied to said feed at a rate sufficient to apply approximately 0.05 to 0.5 gallons of additive per ton of feed.

17. The method of claim 8 wherein said solution is applied to said feed at a rate sufficient to apply approximately 0.065 to 0.07 gallons of additive per ton of feed.

18. A method for treating coal and coke feeds comprising applying to said feed a solution containing an additive in an amount sufficient to treat said feed, said additive comprising a dispersant comprising a water-miscible polymer and an amount of a water-soluble binder that exceeds the amount of said dispersant, wherein said polymer has the following structure:

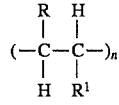

wherein
R is selected from the group consisting of a hydrogen or an alkyl group having between about 1–4 carbon atoms;
$R^1$ is selected from the group consisting of —COOH and —CONH$_2$; and
n is below about 3000.

19. The method of claim 18 wherein
$R^1$ is —COOH; and
n is below about 300.

20. The method of claim 18 wherein
$R^1$ is —CONH$_2$; and
n is below about 3000.

21. The method of claim 18 wherein said binder is selected from the group consisting of a lignosulfonate, a polyether, a polyol, one or more water soluble byproducts produced during the refining of a natural sugar, and combinations thereof.

22. The method of claim 18 wherein said additive comprises approximately 1–10 wt % of said polymer.

23. The method of claim 21 wherein said additive comprises approximately 1–10 wt % of said polymer.

24. The method of claim 21 wherein said solution comprises a fluid and said additive within a range of approximately a 1:1 to 20:1 volume ratio.

25. The method of claim 23 wherein said solution comprises a fluid and said additive within a range of approximately a 1:1 to 20:1 volume ratio.

26. A coal and coke feed treated to suppress dusting and erosion by a process comprising the steps of providing an additive comprising
a dispersant comprising a water-miscible polymer selected from the group consisting of a polyacrylate, and a polyacrylamide, and
a water-soluble binder in an amount that exceeds the amount of said dispersant, said binder selected from the group consisting of a lignosulfonate, a polyether, a polyol, one or more water soluble byproducts produced during the refining of a natural sugar, and combinations thereof;
applying said additive to said feed in an amount sufficient to treat said feed.

27. The product of claim 27 wherein said additive comprises approximately 90–99 wt % of said binder and approximately 1–10 wt % of said polymer.

28. The product of claim 27 wherein said polymer is selected from the group consisting of a polyacrylate and which, absent substituents, has a molecular weight of about 20,000 or below, and a polyacrylamide which, absent substituents, has a molecular weight of about 200,000 or below.

29. The product of claim 28 wherein said solution further comprises water at a volume ratio to said additive within a range of approximately 1:1 to 20:1.

30. The product of claim 29 wherein said solution is applied to said feed at a rate sufficient to apply approximately 0.05 to 0.5 gallons of additive per ton of feed.

31. The product of claim 29 wherein said solution is applied to said feed at a rate sufficient to apply approximately 0.065 to 0.07 gallons of additive per ton of feed.

32. The product of claim 27 wherein said polymer has the following structure:

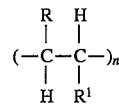

wherein
R is selected from the group consisting of a hydrogen or an alkyl group having between about 1–4 carbon atoms;
$R^1$ is selected from the group consisting of —COOH and —CONH$_2$; and
n is below about 3000.

33. A composition comprising
a coke or coal feed; and
an additive comprising
a water-miscible polymer dispersant selected from the group consisting of a polyacrylate, and a polyacrylamide; and,
an amount of water-soluble binder that exceeds the amount of said dispersant, wherein said binder is selected from the group consisting of a lignosulfonate, a polyether, a polyol, one or more water soluble byproducts produced during the refining of a natural sugar, and combinations thereof.

34. The composition of claim 33 wherein said additive comprises approximately 90–99 wt % of said binder and approximately 1–10 wt % of said dispersant.

* * * * *